United States Patent
Abramson et al.

(10) Patent No.: US 6,473,843 B2
(45) Date of Patent: Oct. 29, 2002

(54) ALTERNATE ACCESS MECHANISM FOR SAVING AND RESTORING STATE OF WRITE-ONLY REGISTER

(75) Inventors: Darren Abramson, Folsom; Joseph Bennett, Rancho Cordova, both of CA (US)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 09/776,221

(22) Filed: Feb. 2, 2001

(65) Prior Publication Data

US 2001/0005875 A1 Jun. 28, 2001

Related U.S. Application Data

(62) Division of application No. 08/884,785, filed on Jun. 30, 1997, now Pat. No. 6,212,609.

(51) Int. Cl.[7] .............................................. G06F 12/00
(52) U.S. Cl. ..................... 711/162; 711/161; 714/24; 713/2; 713/300
(58) Field of Search ................................ 711/161, 162, 711/102; 714/24; 713/2, 300, 323

(56) References Cited

U.S. PATENT DOCUMENTS

| | | | | |
|---|---|---|---|---|
| 5,388,265 A | * | 2/1995 | Volk | ........................ 713/322 |
| 5,530,877 A | * | 6/1996 | Hanaoka | ..................... 713/300 |
| 5,557,777 A | * | 9/1996 | Culbert | ..................... 364/280.2 |
| 5,721,930 A | * | 2/1998 | Kasuga | ....................... 713/323 |

* cited by examiner

*Primary Examiner*—Do Hyun Yoo
*Assistant Examiner*—Nasser Moazzami
(74) *Attorney, Agent, or Firm*—Blakely, Sokoloff, Taylor & Zafman LLP

(57) ABSTRACT

The present invention relates to a method and apparatus for restoring a status data in a computer system. The circuit comprises: a read-only register for storing a read-only status value during a normal mode of operation; a first data path for supplying the read-only status value; a first control signal path for supplying a first control signal for controlling writing the supplied read-only status value into the read-only register during the normal mode of operation, the stored read-only status value being saved into a save area prior to removing power from the read-only register; a second data path for subsequently resupplying from the save area the previously stored read-only status value; a second control signal path for supplying a second control signal for controlling restoration of the re-supplied read-only status value into the read-only register during a restore mode of operation; and circuitry coupling the first and second data and control signal paths to the read-only register to facilitate the writing during the normal mode of operation and the restoration during the restore mode of operation.

8 Claims, 4 Drawing Sheets

ALTERNATE ACCESS MECHANISM FOR SAVING AND RESTORING STATE OF WRITE-ONLY REGISTER

CROSS REFERENCE TO RELATED APPLICATIONS

This application is a divisional of application Ser. No. 08/884,785 filed on Jun. 30, 1997, now U.S. Pat. No. 6,212,609.

BACKGROUND OF THE INVENTION

1. Field of the Invention

The present invention relates in general to the field of computer systems, and more particularly, to a method and apparatus of providing alternate access to registers in peripheral devices within a computer system.

2. Description of Related Art

In a typical computer system that provides power management services, the state of the system is typically saved before power is suspended. The state of the system is restored following a command for a system resume. Such a power management scheme provides a fast resume process and eliminates the need for reinitialization of system parameters such as control and status information and initialization values in registers of peripheral devices.

Peripheral devices (e.g., interrupt controllers, direct memory access controllers, timers) used in a computer system typically include a number of read-only and write-only registers. These registers contain control or status information used for system operation. In many cases, a read-only register and a write-only register may correspond to the same address. Accessing to this same address results in different context depending on whether the access is a read or a write. The contents of these registers have to be saved before the power is suspended and are restored when power is restored.

Conventional techniques for saving and restore the contents of these registers fall into two categories: a hardware approach and a software approach. Approaches in hardware typically involve the use of a battery back-supply for low-power devices or shadow registers. Software approaches typically involve monitoring of the read-only and write-only registers such as continuous polling for read only registers or keeping written copies for write-only registers.

The use of a battery back-up supply requires that the components be fabricated using low power technologies such as Complementary Metal Oxide Semiconductor (CMOS) in a battery back-up environment. When power from the main power is suspended, the back-up power supply is activated while the devices are placed in standby mode. A battery is used to provide the necessary power to keep the contents of these devices intact. There are several disadvantages with this technique. First, the devices have to be fabricated with CMOS technology which may be expensive especially when these devices are integrated with other devices. Second, the design of a system implementing a back-up power supply is complex and expensive.

The use of a shadow register requires the implementation of additional registers which occupy different addresses. The additional registers provide increased accessibility. The disadvantages of this technique include increased device complexity and increased address space.

Software techniques typically involve monitoring of the contents of the read-only and write-only registers. Special programs must be developed to constantly keep track of these contents. This requirement prevents the use of standard software packages. For read-only registers, the contents may be continuously polled to save the status. This polling creates a burden to the processor and the contents may not reflect the actual final values of the registers. For write-only registers, the values to be written are additionally kept separately, either as part of the program or in another more easily accessible storage location. This requires extra effort and additional hardware.

Accordingly, there is a need in the technology to provide an apparatus and method for an alternate access mechanism for the saving and restoring of register contents in a power management environment without increasing hardware complexity or requiring software modification.

SUMMARY OF THE INVENTION

The present invention relates to a method and apparatus for restoring a status data in a computer system. The circuit comprises: a read-only register for storing a read-only status value during a normal mode of operation; a first data path for supplying the read-only status value; a first control signal path for supplying a first control signal for controlling writing the supplied read-only status value into the read-only register during the normal mode of operation, the stored read-only status value being saved into a save area prior to removing power from the read-only register; a second data path for subsequently re-supplying from the save area the previously stored read-only status value; a second control signal path for supplying a second control signal for controlling restoration of the re-supplied read-only status value into the read-only register during a restore mode of operation; and circuitry coupling the first and second data and control signal paths to the read-only register to facilitate the writing during the normal mode of operation and the restoration during the restore mode of operation.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

The present invention discloses a method and apparatus for providing an alternate access mechanism that facilitates the saving and restoring of the contents of write-only registers and read-only registers in peripheral devices used in a computer system. An access control signal is used to provide access of these registers in an alternate access mode to allow reading of the register when the power is suspended and to provide writing to the registers when power is resumed. In particular, the alternate access control signal allows the read-only registers to be written to. For write-only registers, the alternate access control signal allows write-only registers to be read. The use of the alternate access control signal and multiplexing circuitry simplifies the design and reduces the gate count in the devices while facilitating the saving and restoring of the registers in a power managed computer system.

Figure 1:
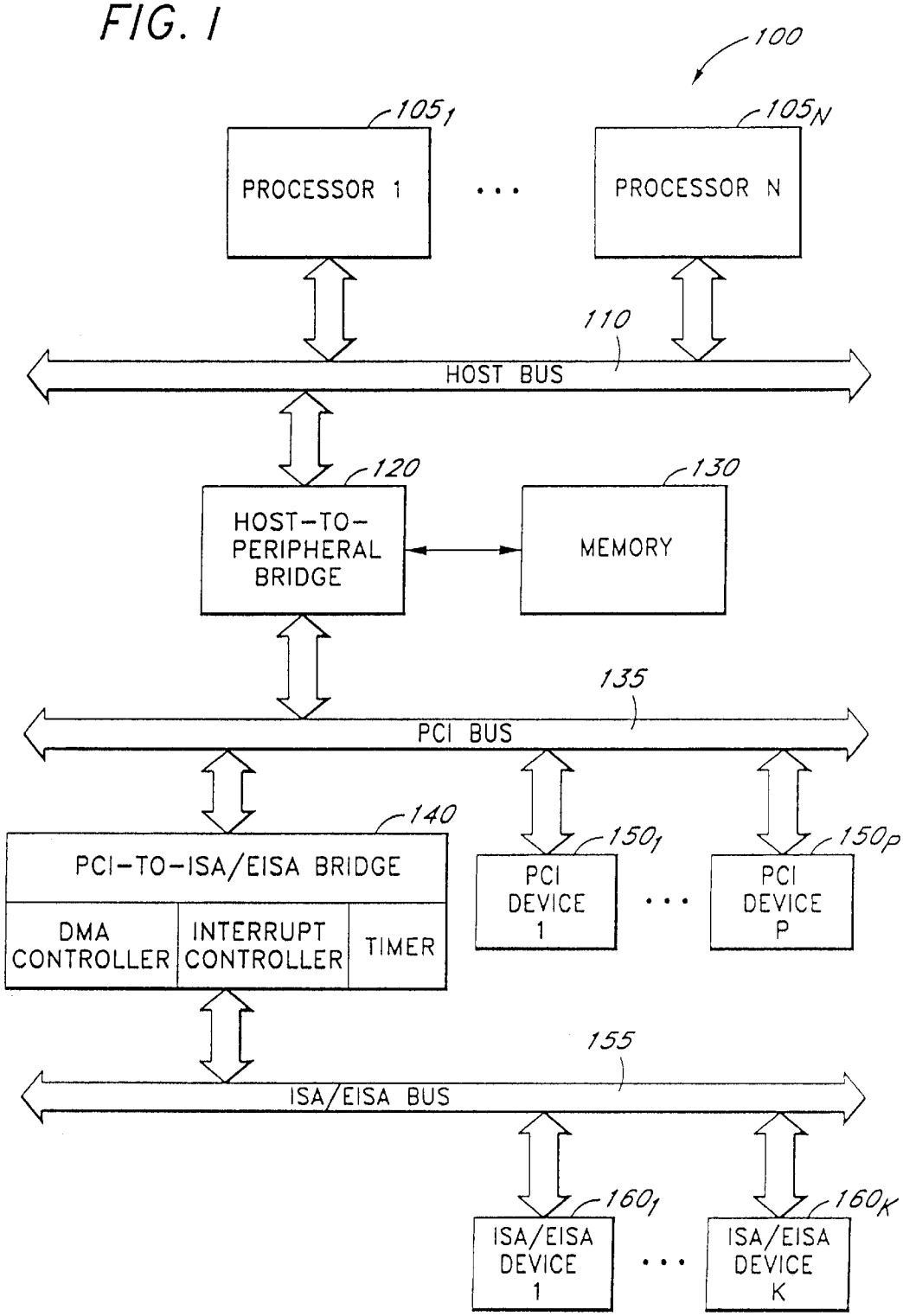
FIG. 1 is a block diagram illustration of one embodiment of a system that operates in accordance with the teachings of the present invention.

Referring to FIG. 1, an illustrative embodiment of a computer system utilizing the present invention is shown. The computer system 100 comprises one or more processors $105_1$–$105_N$ ("N" being a positive whole number) and a main memory element 130 (e.g., dynamic random access memory "DRAM", static random access memory "SRAM" etc.) coupled together by a host bus 110 and a Host-to-Peripheral Bridge 120. In general, the Host-to-Peripheral Bridge 120 operates as an interface between a host bus 110 and a peripheral bus 135. The main memory 130 also includes a non-volatile memory or a separately powered memory (e.g., DRAM, SRAM) for saving contents of registers or other memories when power is removed. Alternatively, the register contents may be written to mass storage such as hard disk before power suspension so that they can be retrieved after power-up.

Processors $105_1$–$105_N$ are any microprocessors. In one embodiment, processors $105_1$–$105_N$ are the Pentium® processors or Pentium® Pro microprocessors manufactured by Intel Corporation at Santa Clara, California.

Host-to-Peripheral Bridge 120 typically includes a cache DRAM controller (CDC), a peripheral bus controller, and a data path unit (DPU). The peripheral bus 135 may comprise a Peripheral Component Interconnect (PCI) bus or any other type of bus architecture. The Host-to-Peripheral Bridge or Host-to-PCI Bridge 120 provides a set of host-to-PCI and PCI-to-host bus transaction translations.

The host bus 110 is a bus that can support transactions to a number of coupled processors. Host bus 110 may be referred to as a parallel bus or multiprocessor bus because it supports parallel operations and multiple processors. It is contemplated that host bus 110 operates in a pipelined manner to increase efficiency. However, these features should not be construed to limit the teachings of the present invention. The present invention can be utilized if there is only one processor coupled to the host bus 110.

The peripheral bus 135 provides a communication path between the processors $105_1$–$105_N$ or main memory element 130 and a plurality of peripheral devices $150_1$–$150_P$ ("P" being a positive whole number). These peripheral devices $150_1$–$150_P$ may include I/O devices such as disk controller, and peripheral components such as DMA controllers, interrupt controllers, and timers.

The PCI-to-ISA Bridge 140 provides the communication path between the peripheral or PCI bus 135 and the expansion bus 155. In one embodiment of the present invention the PCI-to-ISA Bridge 140 also integrates many peripheral devices such as a DMA controller, an interrupt controller, and a timer.

The expansion bus 155 provides a communication path between the peripheral bus 135 and a plurality of expansion peripheral devices $160_1$–$160_K$ ("K" being a positive whole number). The expansion peripheral devices $160_1$–$160_K$ may include any suitable devices such as DMA controllers, interrupt controllers and programmable timers. The expansion bus 155 may comprise an Industry Standard Architecture (ISA) bus or an Extended Industry Standard Architecture (EISA) bus.

The peripheral devices, either standalone (e.g. devices $150_1$–$150_P$ or devices $160_1$–$160_K$) or integrated within the PCI-to-ISA Bridge 140, contain a plurality of read-only and write-only registers (not shown). In the normal mode, the read-only registers contain values that may be read by the processor. The read-only registers are written to or updated through an internal process. For example, a status bit is set when a terminal count is reached in a direct memory access (DMA) controller. This terminal count condition is controlled by a counting circuit which is a part internal to the DMA controller. The read-only registers typically contain status information. Write-only registers contains values to be written by the host in the normal mode. The write-only registers typically contain command information.

The present invention provides an alternate access mechanism to allow any one of the processors $105_1$ . . . $105_N$, to write to the read-only (RO) registers and to read from the write-only (WO) registers located in these peripheral devices $160_1$ . . . $160_K$ or $150_1$ . . . $150_P$. Writing to the RO registers is performed after a system resume following power suspension, so that the content of the registers may be restored. Reading from the WO registers is performed before power suspension so that the contents of the register may be saved. This alternate access mechanism is implemented by a read-only register logic circuit (for RO registers) and a write-only register logic circuit (for WO registers).

Figure 2:
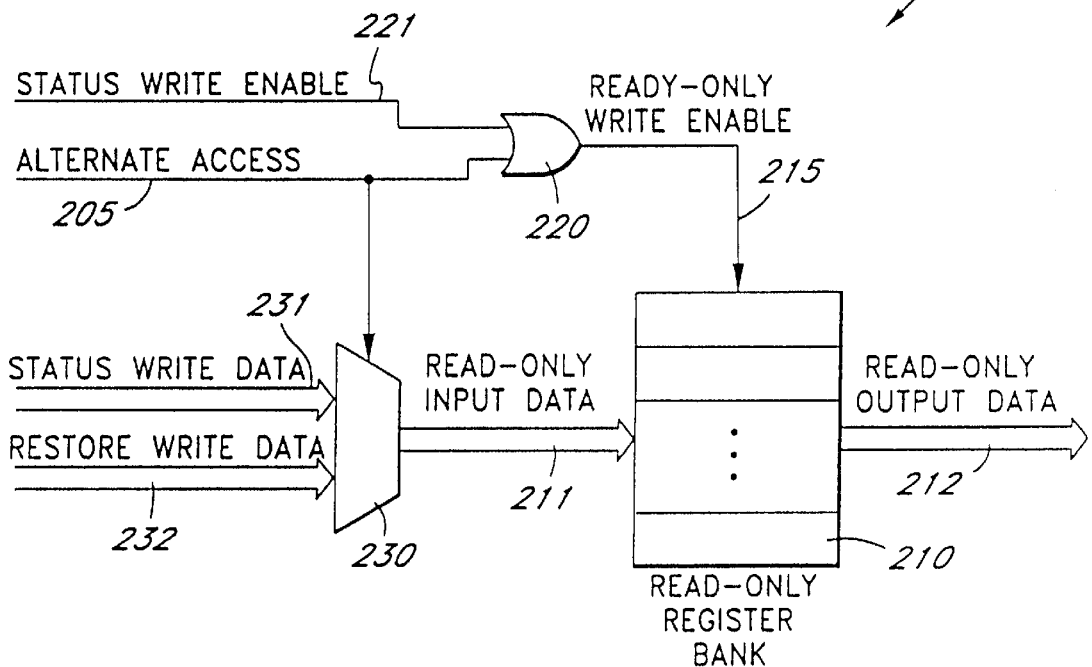
FIG. 2 is a circuit illustrating one embodiment of the alternate access for read-only registers.

Referring to FIG. 2, a circuit illustrating one embodiment of the read-only register logic circuit 200 is shown. Read-Only (RO) register logic circuit 200 comprises a RO register bank 210, an OR gate 220, and a write multiplexer 230.

The OR gate 220 receives two input signals: a status write enable signal via signal line 221 and an alternate access control signal via signal line 205. The output of the OR gate 220 is a RO write enable signal 215. The status write enable signal 221 is controlled by the internal circuitry for updating the registers' contents. The alternate access signal 205 is controlled by any of the processors $105_I$ to $105_N$ typically.

The write multiplexer 230 receives two inputs: the status write data 231 and the restore write data 232. The status write data 231 is typically issued by the internal circuitry in response to a register update. The restored write data 232 is typically provided by any of the processors $105_I$ to $105_N$. The write multiplexer 230 outputs the RO input data signal line 211. The write multiplexer 230 is controlled by the alternate access control signal via signal line 205. When the alternate access control signal provided via signal line 205 is asserted HIGH, the write multiplexer 230 provides the restore write data via signal line as RO input data line 232 to 211. When the alternate access control signal provided via signal line 205 is de-asserted LOW, the write multiplexer 230 transfers the status write data via signal line 231 as the RO input data via signal line 211.

The RO register bank 210 comprises a plurality of read-only registers. These registers are designed for read-only during normal operation. Each register in the bank is individually addressed. For simplification purpose, the address decoding circuitry associated with the RO register bank 210 is not shown.

The RO register bank 210 receives the read-only input data via signal line 211 and generates read-only output data via signal line 212. The reading and writing of the RO register bank 210 is controlled by the RO write enable signal provided via signal line 215. When the RO write enable signal provided via signal line 215 is asserted HIGH, the RO register bank 210 is configured in the write mode and the data presented as the RO input data via signal line 211 is written into the addressed register. When the RO write enable signal provided via signal line 215 is de-asserted (i.e.

LOW), the RO register bank 210 is configured for in the read mode and the content of the addressed register is made available at RO output data 212.

The RO write enable signal provided via signal line 215 is asserted HIGH when either the status write enable signal provided via signal line 221 or the alternate access control signal provided via signal line 205 is asserted HIGH. The status write enable signal provided via signal line 221 is asserted HIGH when the internal mechanism of the device is updating the content of the selected register at which time the status write data provided via signal line 231 contains valid status information. Unless there is an update of the status of a register in read-only register bank 210, the status write enable signal provided via signal line 221 is normally LOW. The alternate access control signal provided via signal line 205 is asserted HIGH when there is a need to restore the contents of the registers in the RO register bank 210. This event normally takes place upon power up following a system resume. In normal operation, the alternate access control signal provided via signal line 205 is LOW.

In normal operation, where there is no status update, both the status write enable provided via signal line and the alternate access control signals provided via signal line are LOW, putting the RO register bank 210 in the read mode. These registers, configured a read-only mode can be accessed obtain status information.

In a power management environment, the contents of these registers which need to be saved before power is removed and restored after the system is resumed. Before power is suspended, the contents of the registers in RO register bank 210 are saved in memory in the system. Examples of such memory includes a non-volatile memory (e.g. FLASH memory), and a memory (e.g. DRAM, SRAM) which is separately powered in a system where power management is performed on a portion of the system. Yet another example is a mass storage device such as a hard drive. When power is again available following a system resume, the saved contents are presented at the restore write data 232 while the alternate access control signal is asserted HIGH. This enables the RO register bank 210 and places the RO register bank 210 in the write mode. The restore write data provided via signal line 232 is transferred as the RO input data provided via signal line 211, via the write multiplexer 230, and is written to the addressed register in the RO register bank 210. In this manner, the alternate access control signal via signal line 205 and the write multiplexer 230 allow the saved contents of the RO register bank 210 to be restored following a system resume.

Figure 3:
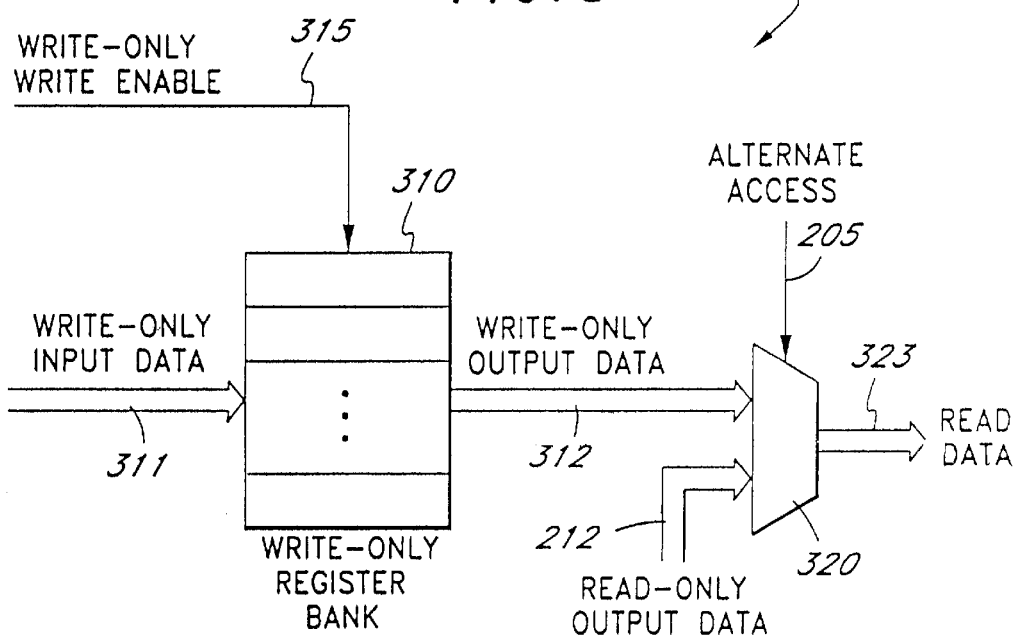
FIG. 3 is a circuit illustrating one embodiment of the alternate access for write-only registers.

Referring to FIG. 3, a circuit illustrating one embodiment of the write-only register logic circuit 300 is shown. The Write Only (WO) register logic circuit 300 comprises a write-only (WO) register bank 310 and a read multiplexer 320.

The WO register bank 310 comprises a plurality of write-only registers. These WO registers are configured such that they can only be written to in normal operation. Each register in the bank is individually addressed. For simplification purposes, the address decoding circuitry associated with e WO register bank 310 is not shown.

The WO register bank 310 receives the WO input data 311 as input and generates the WO output data 312. The reading and writing of the WO register bank 310 is controlled by a WO write enable signal provided via signal line 315. When the WO write enable signal provided via signal line 315 is asserted HIGH, the WO input data provided via signal line 311 is written into the addressed register in the WO register bank 310. When the WO write enable signal provided via signal line 315 is asserted LOW, the contents of the addressed register in the WO register 310 are output as WO output data via signal line 312.

Read multiplexer 320 receives two inputs: the WO output data provided via signal line 312 and the RO output data provided via signal line 212. The WO output data provided via signal line 312 is the output of the WO register bank 310 when the WO register bank 310 is in the read mode. The RO output data provided via signal line 212 is the output of the RO register bank 210 as shown in FIG. 2. The output of the read multiplexer 320 is the read data as provided via signal line 323. The read multiplexer 320 is controlled by the alternate access control signal provided via signal line 205. When the alternate access control signal provided via signal line 205 is asserted HIGH, the WO output data 312 is transferred as read data provided via signal line 323. When the alternate access control signal provided via signal line 205 is de-asserted LOW, the RO output data provided via signal line 212 is transferred as the read data via signal line 323.

In normal operation, the alternate access control signal provided via signal line 205 is LOW. Therefore, the read data provided via signal line 323 takes the value of the RO output data provided via signal line 212. The WO register bank 310 is in the write mode when the WO write enable signal provided via signal line 315 is asserted HIGH, as required by the system. The software provides access to these registers in a write only manner to write command or control data.

In a power management environment, the contents of these registers need to be saved before power is removed and restored after the system is resumed. Before power suspension, the alternate access control signal provided via signal line 205 is asserted HIGH and the WO write enable signal provided via signal line 315 is de-asserted LOW, allowing the contents of the addressed register in WO register bank 310 to be available at WO output data provided via signal line 312 which in turn is transferred to read data provided via signal line 323. The power suspension software obtains the contents of the addressed registers and saves them in a nonvolatile memory in the system. Upon power up following a system resume, these saved contents are written back to the WO register bank 310 through the normal write operation. Therefore, the alternate access control signal provided via signal line 205 and the read multiplexer 320 allow the contents of the WO register bank 310 to be read before power is removed.

Figure 4:
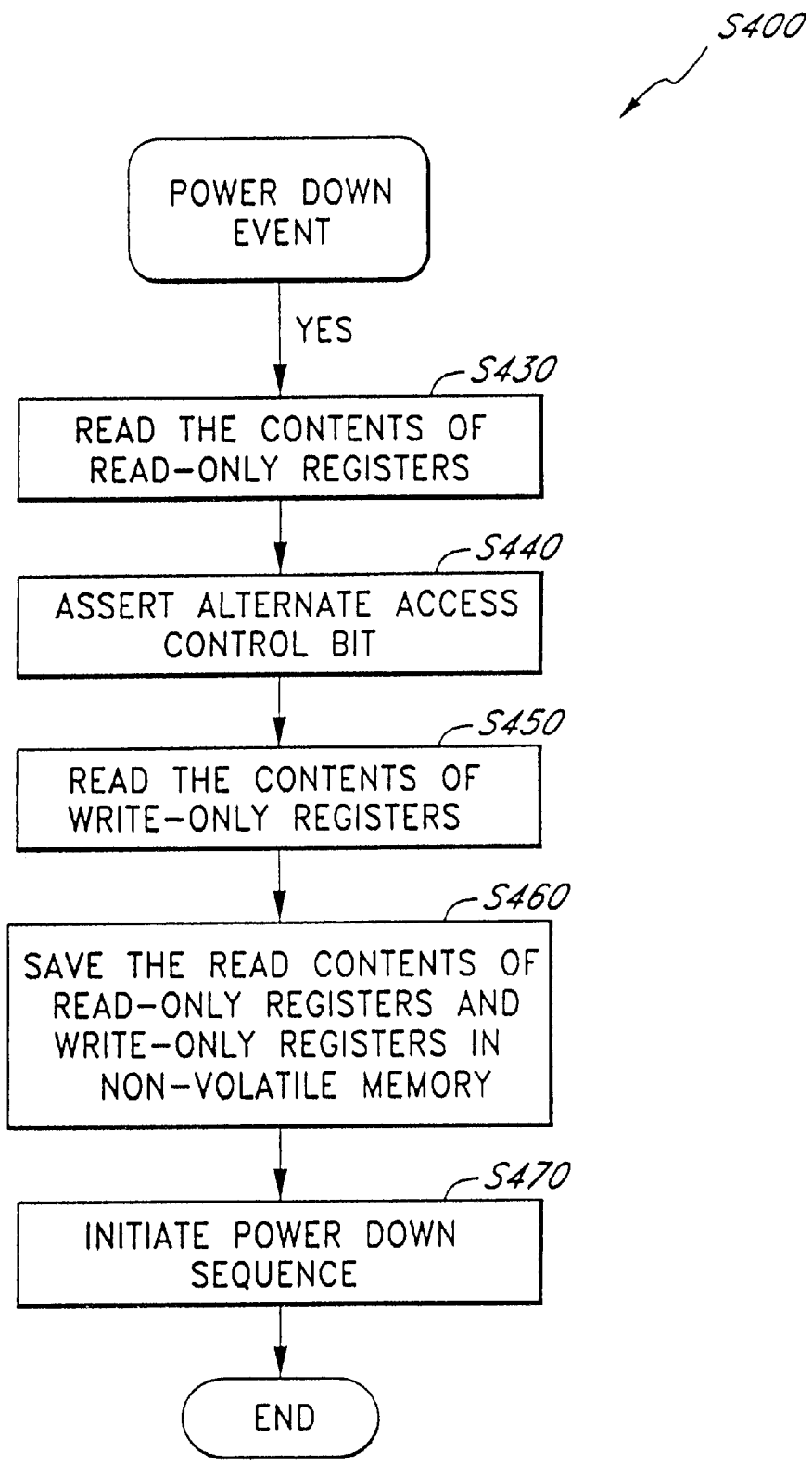
FIG. 4 is a flow chart illustrating a process of the alternate access during power suspension.

Referring to FIG. 4, a flowchart illustrating one embodiment of the process of powering down the system is shown. From a POWER DOWN EVENT state, the power suspension process S400 proceeds to read the contents of the read-only registers (step S430). The alternate access control bit is then SET to assert the alternate access control signal HIGH (Step S440). This process step allows the write-only registers to be read (Step S450). Then the read contents of the read only registers and write-only registers are saved in a non-volatile memory in the system (Step S460). After saving these values, process S400 proceeds to initiate the power suspension sequence to remove power from the system (Step S470). The process is then terminated.

Figure 5:
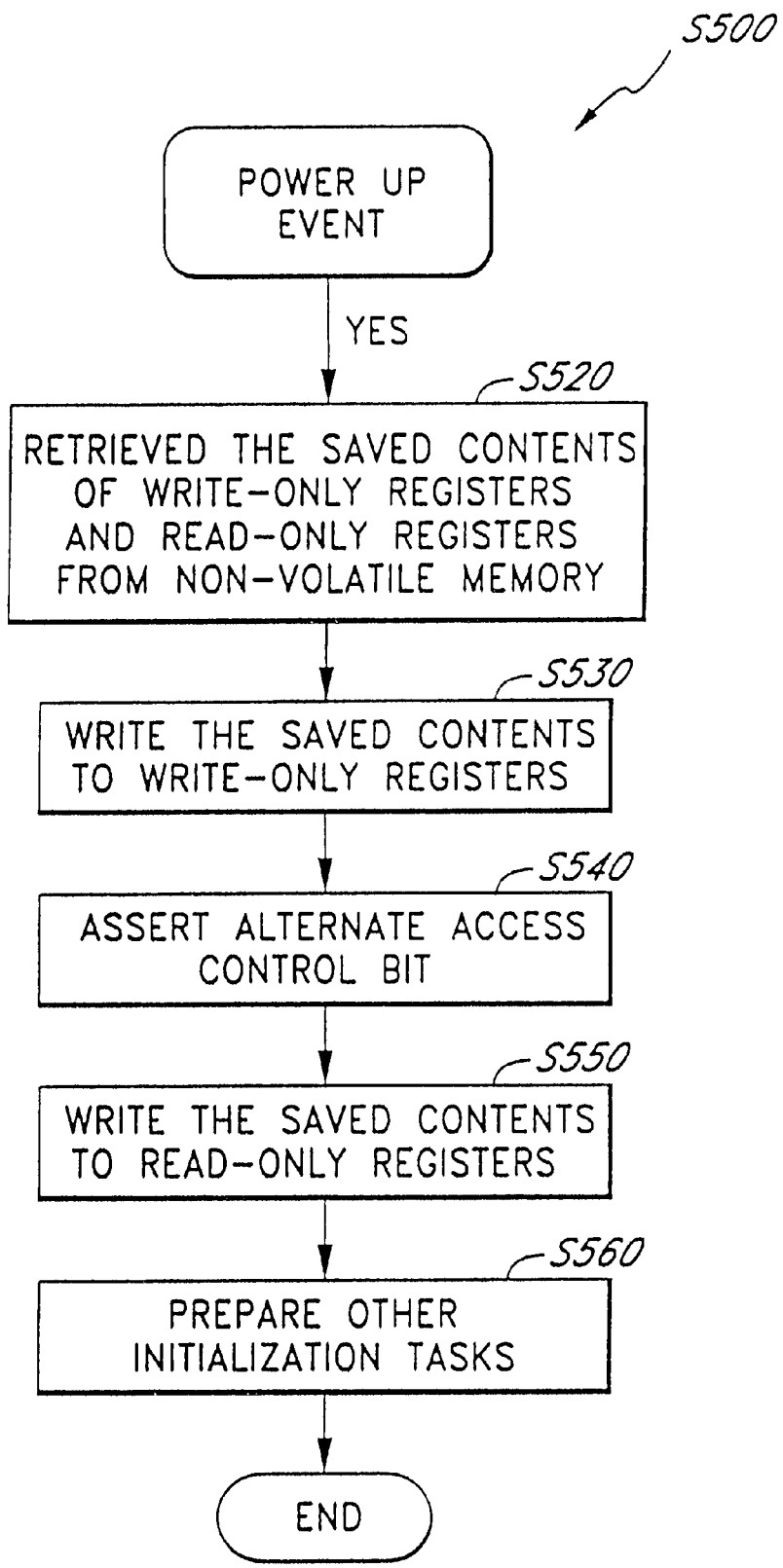
FIG. 5 is a flowchart illustrating a process of the alternate access during power up.

Referring to FIG. 5, a flow chart illustrating one embodiment of the process of powering up the system is shown. From a POWER UP EVENT state, the power-up or power resumption process S500 proceeds to retrieve the saved contents of write-only registers and read-only registers from the non-volatile memory in the system (Step S520). Then the saved contents of the write-only registers are written using the normal write operation (Step S530). The alternate access control bit is SET to assert the alternate access control signal HIGH (Step S540) allowing the read-only registers to be written. Then, the read-only registers are written with the corresponding saved contents (Step S550). After restoring the contents of the write-only and read-only registers, the process S500 proceeds to perform other initialization tasks (S560). The process is then terminated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A circuit comprising:
    a) a write-only register for storing a write-only control value during a normal mode of operation;
    b) a first data path for supplying the stored write-only control value;
    c) a second d path for supplying a read value;
    d) a control signal path for supplying a control signal for controlling reading the read value in the normal mode of operation and the stored write-only control value from the write-only register during a save mode of operation, the stored write-only control value being saved into a save area prior to removing power from the write-only register; and
    e) circuitry coupling the write-only register to the first data path, the second data path, and the control signal path to facilitate said reading during said normal mode of operation and said save mode of operation.

2. The circuit of claim 1 wherein said save area corresponds to one of a non-volatile memory, a separately powered memory, and a mass storage device.

3. The circuit of claim 1 wherein said circuitry comprises:.
    a selector coupled to receive said stored write-only control value and said read value, said selector selecting the read value for reading during said normal mode of operation and the stored write-only value for saving during said save mode of operation in response to the control signal.

4. The circuit of claim 3 wherein said selector is multiplexer.

5. A machine implemented method comprising:
    a) during a normal mode of operation,
        1) storing a write-only control value in a write-only register,
        2) reading a read value on a first data path; and
    b) during a save mode of operation,
        1) reading the stored write-only control value on a second data path under the control of a control signal;
        2) saving the stored write-only control value into a save area prior to removing power from the write-only register.

6. The method of claim 5 wherein said save area corresponds to one of a non-volatile memory, a separately powered memory, and a mass storage device.

7. A chipset for providing an interface between a peripheral bus and an expansion bus, the chipset comprising:
    a peripheral-to-expansion bridge for providing bus transaction translations; and
    an integrated circuit component, the integrated circuit component comprising:
        a) a write-only register for storing a write-only control value during a normal mode of operation;
        b) a first data path for supplying the stored write-only control value;
        c) a second data path for supplying a read value;
        d) a control signal path for supplying a control signal for controlling reading the read value in the normal mode of operation and the stored write-only control value from the write-only register during a save mode of operation, the stored write-only control value being saved into a save area prior to removing power from the write-only register; and
        e) circuitry coupling the write-only register to the first data path, the second data path, and the control signal path to facilitate said reading during said normal mode of operation and said save mode of operation.

8. The chipset of claim 7 wherein said circuitry comprises:
    a selector coupled to receive said stored write-only control value and said read value, said selector selecting the read value for reading during said normal mode of operation and the stored write-only value for saving during said save mode of operation in response to the control signal.

* * * * *

UNITED STATES PATENT AND TRADEMARK OFFICE
CERTIFICATE OF CORRECTION

PATENT NO. : 6,473,843 B2
DATED : October 29, 2002
INVENTOR(S) : Abramson et al.

It is certified that error appears in the above-identified patent and that said Letters Patent is hereby corrected as shown below:

Column 1,
Line 41, delete "back-supply", insert -- back-up supply --.

Column 5,
Line 60, delete "with e", insert -- with the --.

Signed and Sealed this

Twenty-second Day of April, 2003

JAMES E. ROGAN
*Director of the United States Patent and Trademark Office*